United States Patent [19]
Konishi

[11] Patent Number: 5,278,347
[45] Date of Patent: Jan. 11, 1994

[54] AUTO-PLAY MUSICAL INSTRUMENT WITH AN ANIMATION DISPLAY CONTROLLED BY AUTO-PLAY DATA

[75] Inventor: Shinya Konishi, Hamamatsu, Japan

[73] Assignee: Kabushiki Kaisha Kawai Gakki Susakusho, Shizuoka, Japan

[21] Appl. No.: 842,518

[22] Filed: Feb. 27, 1992

[30] Foreign Application Priority Data

Feb. 28, 1991 [JP] Japan ................................. 3-58187
Mar. 12, 1991 [JP] Japan ................................. 3-72495

[51] Int. Cl.⁵ .................. G09B 15/04; G10H 1/38
[52] U.S. Cl. ............................. 84/613; 84/477 R; 84/DIG. 22
[58] Field of Search ............... 84/477R; 478, 610, 613, 615, 644, 464R, 601, 602, 609, 649, 653; DIG. 6; 358/342

[56] References Cited

U.S. PATENT DOCUMENTS

| | | | |
|---|---|---|---|
| 4,992,885 | 2/1991 | Yoshio | 358/342 |
| 5,005,459 | 4/1991 | Adachi et al. | 84/478 |
| 5,046,004 | 9/1991 | Tsumura et al. | 84/602 |
| 5,048,390 | 9/1991 | Adachi et al. | 84/464 R |
| 5,131,311 | 7/1992 | Murakami et al. | 84/609 |

Primary Examiner—Stanley J. Witkowski
Assistant Examiner—H. Kim

[57] ABSTRACT

An auto-play apparatus for an electronic musical instrument generates auto-play tones or auto-accompaniment tones such as melody, chord, bass, and drum tones on the basis of preprogrammed auto-play data. The apparatus includes a detector for detecting note data in the auto-play data. Every time a tone corresponding to note data in the auto-play data is generated, a pre-programmed display sequence of animation patterns advances. Animation display pattern data representing motions of a person or animal are sequentially sent to a display on the basis of the animation display sequence. Every time a tone corresponding to note data in the auto-play data is generated, the display patterns change motion by motion, thus obtaining an animation display.

14 Claims, 15 Drawing Sheets

ANIMATION SEQUENCE

FIG. 15

```
OF0H   STORE ADRS/PATTERN DATA
OF0H   STORE ADRS/PATTERN DATA
OF0H   STORE ADRS/PATTERN DATA
OF0H   STORE ADRS/PATTERN DATA
OF1H           SONG NAME
OC0H          PROGRAM CHANGE
OF2H         TONE COLOR NAME
O3CH(KEY NO.)    ,    O20H(STEP TIME)
O10H(GATE TIME)  ,    O7FH(VELOCITY)
           ⋮
OF4H            BAR NO.
OF3H          DISPLAY SYNC
OF5H          CHORD NAME
0
0
O48H(KEY NO.)    ,    O20H(STEP TIME)
O10H(GATE TIME)  ,    O5FH(VELOCITY)
OE1H(REPEAT MARK)
           ⋮
```

4

} NOTE DATA

} NOTE DATA

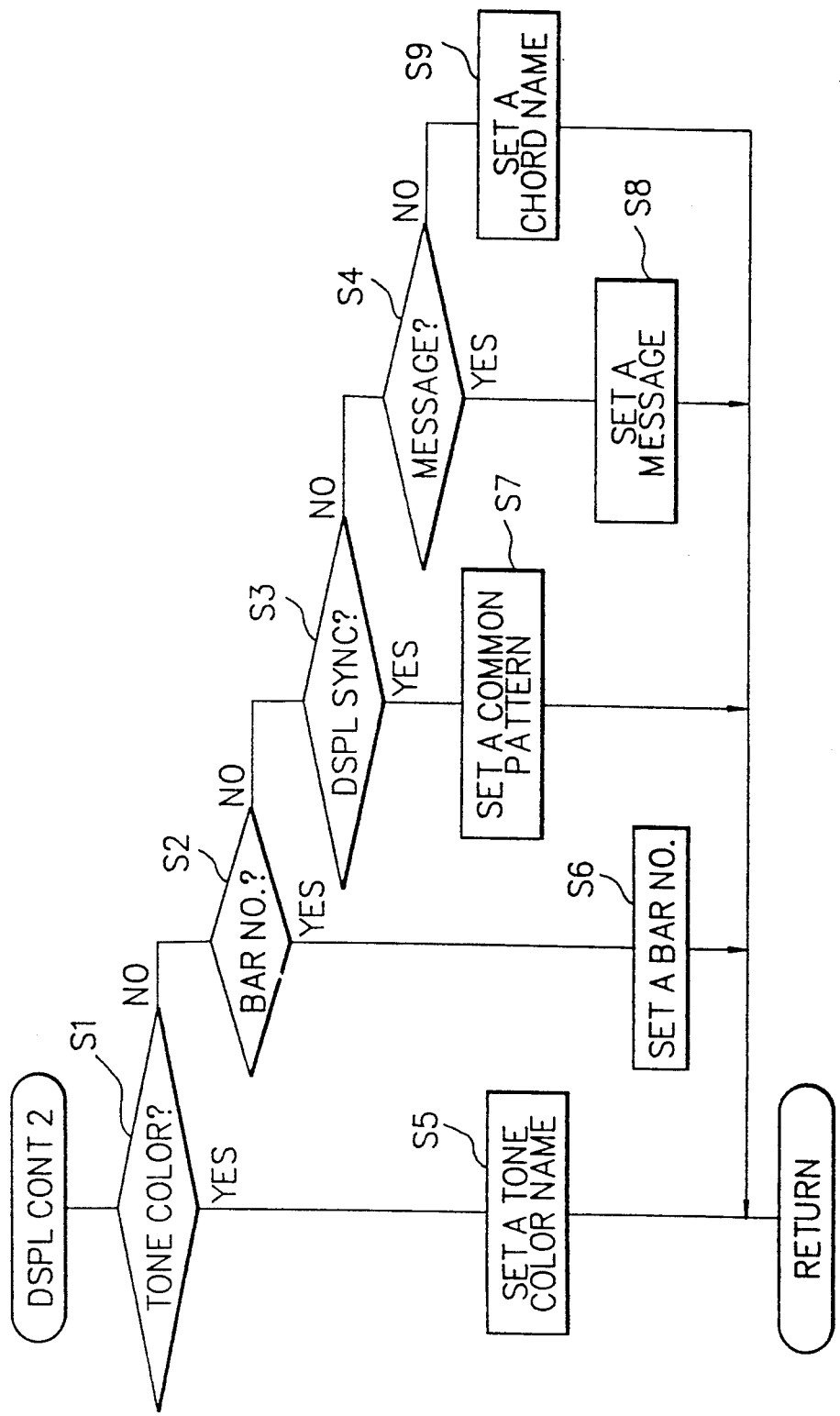

AUTO-PLAY MUSICAL INSTRUMENT WITH AN ANIMATION DISPLAY CONTROLLED BY AUTO-PLAY DATA

BACKGROUND OF THE INVENTION

1. Field of the Invention

The present invention relates to an auto-play apparatus for performing an auto-play operation on the basis of auto-play data and, more particularly, to an electronic musical instrument, which performs an animation display by changing display patterns on a display in response to every note data in the auto-play data.

2. Description of the Background Art

Conventionally, an auto-play apparatus is known. The auto-play apparatus is arranged integrally with or separately from an electronic musical instrument such as an electronic keyboard, an electronic piano, or the like, and performs an auto-play operation on the basis of auto-play data stored in an internal memory such as a ROM or of externally input auto-play data.

The auto-play apparatus has a display (integrally or separately), and can display a selected rhythm name, tone color name, song name, and the like.

However, the display of the conventional auto-play apparatus is exclusively used for displaying the rhythm name, song name, and the like, and does not provide visual amusement to a user by, e.g., variously changing a display according to played-back tones. Thus, the display function of the display is not fully utilized.

SUMMARY OF THE INVENTION

It is an object of the present invention to provide an auto-play apparatus, which can entertain a user with music in both aural and visual senses by changing a pattern, which is displayed on a display and represents a person or animal, motion by motion in response to every note data of auto-play data.

According to the present invention, an auto-play musical instrument with an animation display controlled by auto-play data, comprises: tone generator means for generating auto-play tones on the basis of auto-play data; means for supplying a series of auto-play data to the tone generator means; detection means for detecting note data constituting the auto-play data; animation sequence data memory means which stores animation sequence data; and from which sequence data representing an animation sequence are sequentially read out at every note timing detected by the detection means; animation display pattern data memory means for storing animation display pattern data in units of motions of a person or animal in correspondence with the animation sequence; and display control means for reading out corresponding animation display pattern data from the animation display pattern data memory means in response to the animation sequence data obtained at every note timing from the animation sequence data memory means, and supplying the readout data to a display.

Every time a playback note is changed according to an auto-play operation, a display pattern of a person or animal changes motion by motion, thus obtaining an animation display.

Preferably, the auto-play data includes a set of animation display pattern data, and the content of the animation display pattern data is rewritten to obtain different display patterns in correspondence with different auto-play operations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 15 is a view showing the content of auto-play data;

FIG. 17 is a flow chart showing in detail display control processing executed by the CPU.

DETAILED DESCRIPTION OF THE PREFERRED EMBODIMENTS

Figure 1:
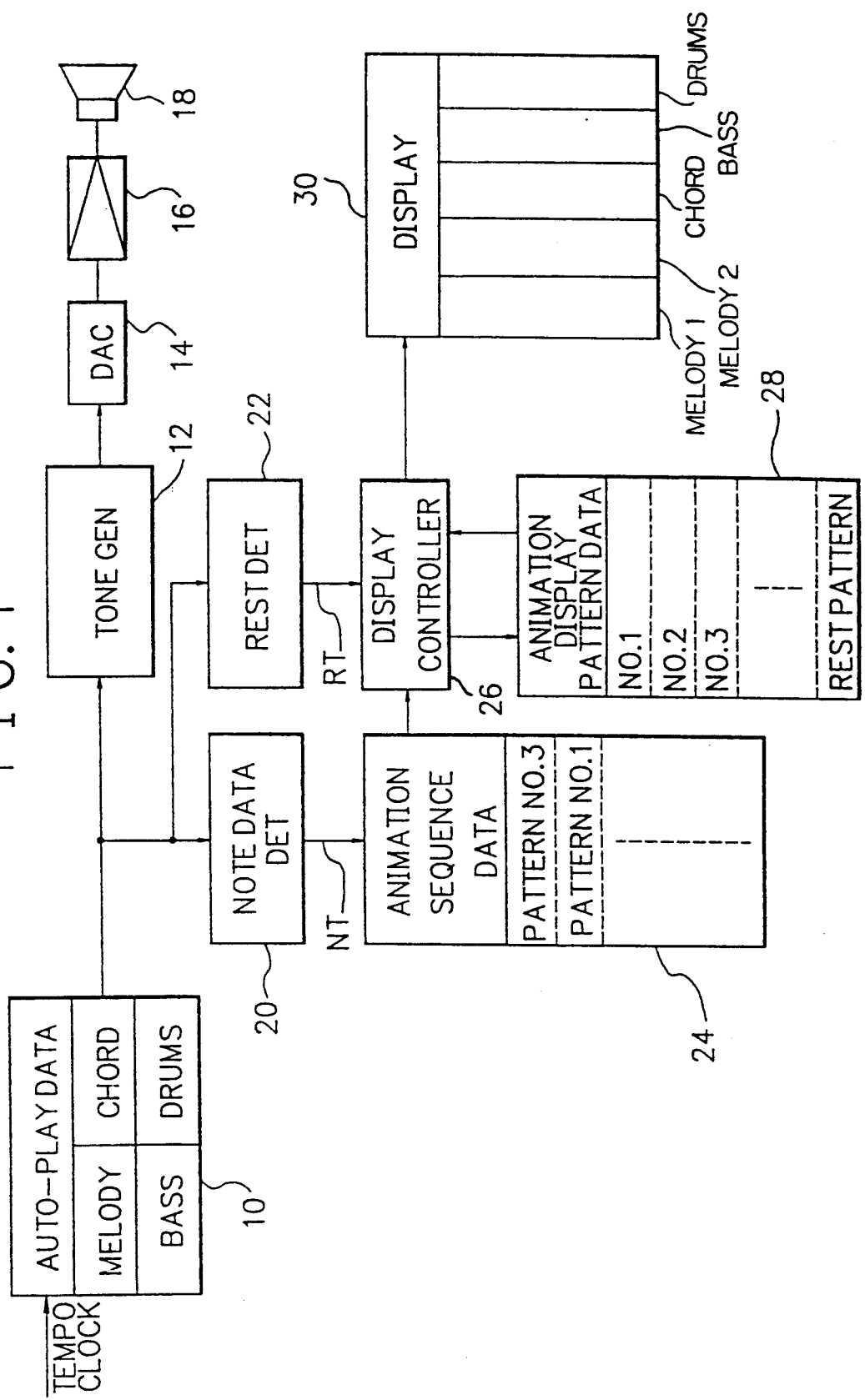
FIG. 1 is a block diagram showing elemental features of an auto-play apparatus according to an embodiment of the present invention.

FIG. 1 is a block diagram showing the elemental features of an auto-play apparatus of the present invention. An auto-play data source 10 comprises a ROM, or a RAM connected to, e.g., an external storage device such as a floppy disk, or a communication interface. The source 10 supplies a note data string used for automatically playing tone parts, e.g., melody, chord, bass, and drum parts, to a tone generator 12 in synchronism with tempo clocks. The tone generator 12 generates tone generation signals of the tone parts from PCM waveform data on the basis of the input note data. The tone generation signals are converted into analog tone signals by a D/A converter 14, and are supplied to a loudspeaker 18 through an amplifier 16.

Auto-play data read out from the auto-play data source 10 are also supplied to a note data detector 20 and a rest detector 22. The note data detector 20 detects note data in auto-play data in units of tone parts, and generates note timing information NT. The rest detector 22 detects a rest in auto-play data, and generates rest timing information RT.

Pre-programmed animation sequence data are sequentially read out from an animation sequence data memory 24 on the basis of the note timing information NT. The animation sequence data correspond to an array of numbers of animation patterns to be displayed. According to the sequence data, a display pattern changes at a tone generation timing of a note, thus displaying an animation.

The animation sequence data are supplied to a display controller 26. The display controller 26 reads out display pattern data corresponding to the numbers of animation patterns indicated by the animation sequence data from an animation display pattern data memory 28, and supplies the readout data to a display 30. The animation display pattern data memory 28 stores a basic display pattern of a person or animal, and a plurality of motion display patterns, which change motion by motion, in correspondence with the numbers of the animation sequence data. The memory 28 stores different animation display patterns in units of tone parts, and also stores a rest display pattern corresponding to a rest.

The display 30 has display regions corresponding to the tone parts such as melody, chord, bass, and drum parts. On each display region, a display pattern corresponding to the tone part changes motion by motion every time a tone corresponding to a note in auto-play data is generated, thus displaying an animation. At the rest timing of auto-play data, a rest pattern is displayed on the display region of the corresponding part.

Figure 2:
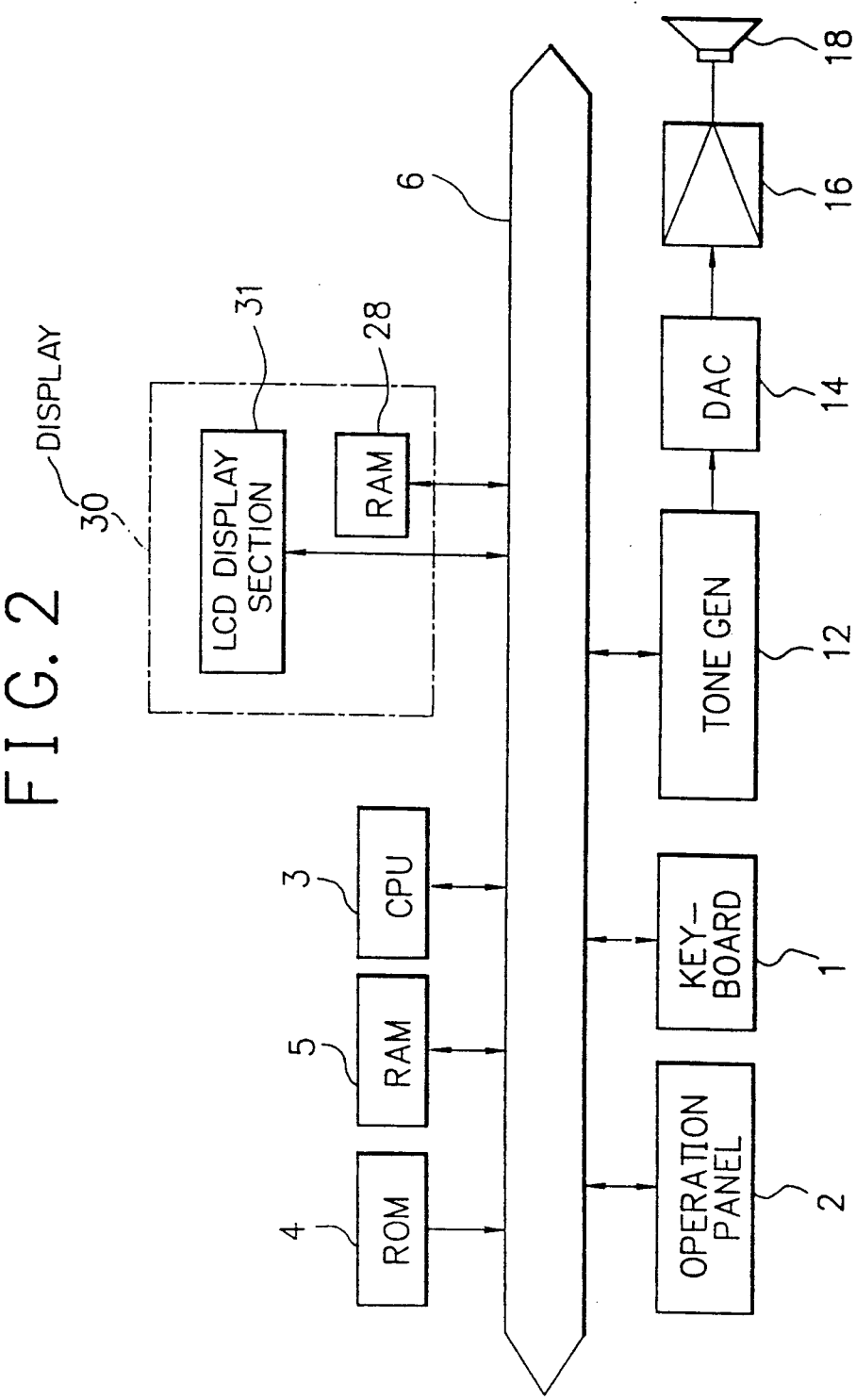
FIG. 2 is a schematic block diagram for explaining the arrangement of an electronic musical instrument according to the present invention.

FIG. 2 is a schematic block diagram for explaining the arrangement of an electronic musical instrument such as an electronic keyboard, which incorporates the present invention. In FIG. 2, a keyboard 1, an operation panel 2, a CPU 3, a ROM 4, a RAM 5, a tone generator 12, and a display 30 are connected to a bus line 6 including a data bus, an address bus, and the like, so as to communicate data with each other.

The keyboard 1 comprises one or a plurality of keyboards each including a plurality of keys, and key switches arranged in correspondence with the keys. The key switch can detect key ON and OFF events, and can also detect the operation speed of a corresponding key.

The operation panel 2 is arranged with operation members for setting a rhythm, a tone color, a tone volume, an effect, and the like, and an operation member such as a demonstration switch for instructing an auto-play operation on the basis of preset auto-play data.

The CPU 3 performs scan processing of the key switches of the keyboard 1, and scan processing of the operation members of the operation panel 2 according to a program stored in the ROM 4, and detects the operation states (a key ON event, a key OFF event, a key number of an operated key, a velocity associated with the operation speed of a key, and the like) of each key of the keyboard 1, and the operation states of each operation member of the operation panel 2. The CPU 3 executes processing (to be described later) according to an operation of the key or the operation member.

Figure 3:
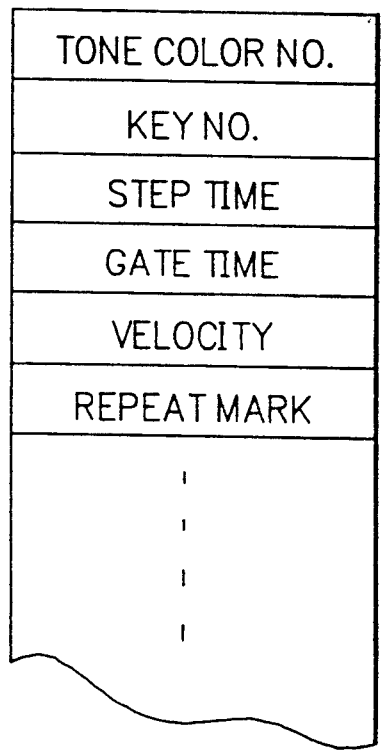
FIG. 3 is a view for explaining the content of auto-play data.

The ROM 4 stores a work program of the CPU 3, tone waveform data, and n kinds of patterns used when person patterns in various poses (to be described layer) are displayed on an LCD display section 31 of the display 30. The ROM 4 also stores, as preset data, several kinds of auto-play data used when an auto-play operation is performed. The auto-play data consists of tone color number data for specifying a kind of tone color, key number data for specifying a kind of key, step time data indicating a tone generation timing, gate time data representing a tone generation duration, velocity data representing a key ON speed (tone generation level), repeat mark data indicating a repeat point, and the like, as shown in FIG. 3.

Figure 4:
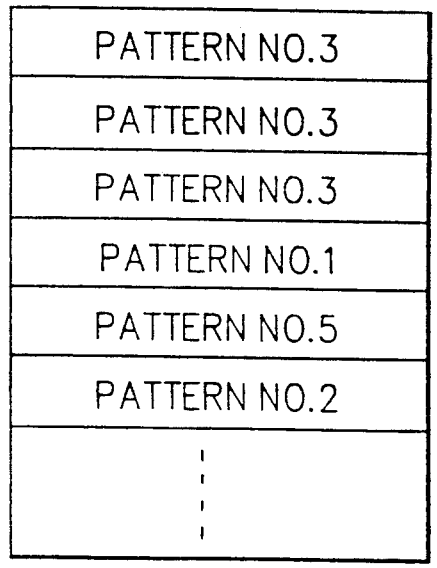
FIG. 4 is a view for explaining the content of a display sequence.

The ROM 4 also stores a plurality of kinds of animation sequence data in correspondence with the kinds of auto-play data. The animation sequence data determines a display order of various poses of a person pattern to be displayed on the display section 31 of the display 30 when selected auto-play data is played back. In the animation sequence data, as shown in FIG. 4, pattern numbers (addresses of a RAM 28 (to be described later)) are stored in the display order.

Figure 5:
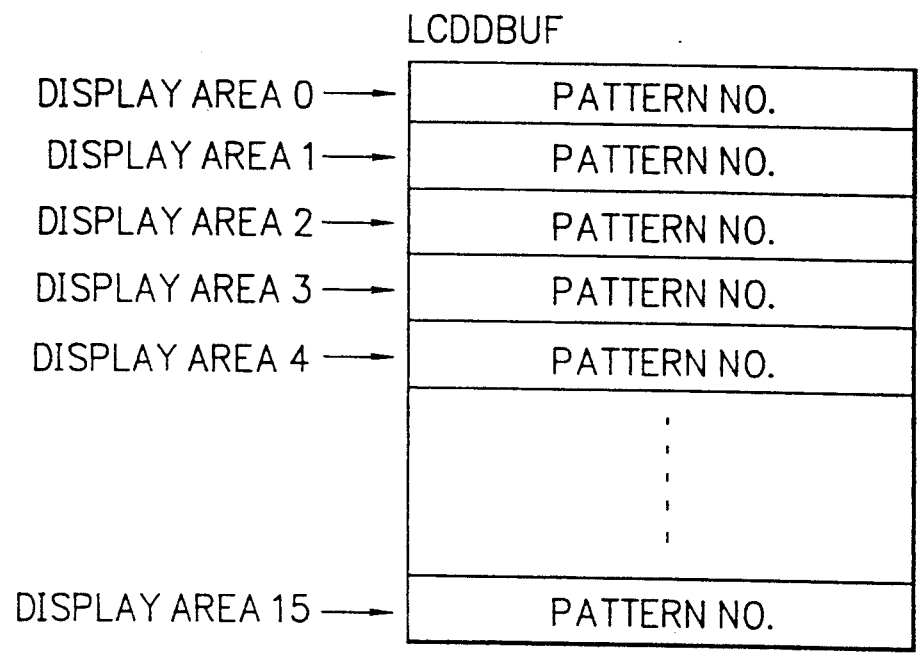
FIG. 5 is a view for explaining the configuration of a buffer LCDDBUF.

The RAM 5 has storage areas for temporarily storing various pieces of information during execution of various processing operations by the CPU 3, and for storing information obtained as a result of the various processing operations, and also has a buffer LCDDBUF, as shown in FIG. 5. The storage areas of the buffer LCDDBUF correspond to 16-divided display regions of the display section 31 of the display 30.

The tone generator 12 has a plurality of tone generation channels, and can simultaneously generate a plurality of tones. The tone generator 12 forms digital tone data on the basis of key number information sent from the CPU 3 and representing a key, tone parameter information set upon operation of the operation members, and the like. The tone generator 12 includes a digital filter, a digital effect addition circuit, and the like.

The tone data generated by the tone generator 12 is converted into an analog tone signal by a D/A converter 14. The tone signal is amplified by an amplifier 16, and the amplified tone signal is supplied to a loudspeaker 18.

Figure 12:
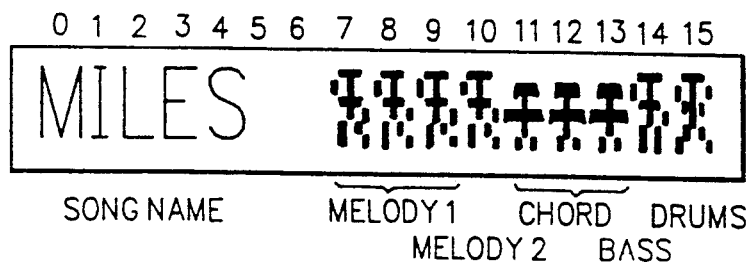
FIGS. 12(a) and 12(b) are views for explaining display patterns on a display section of the display.
Figure 12:
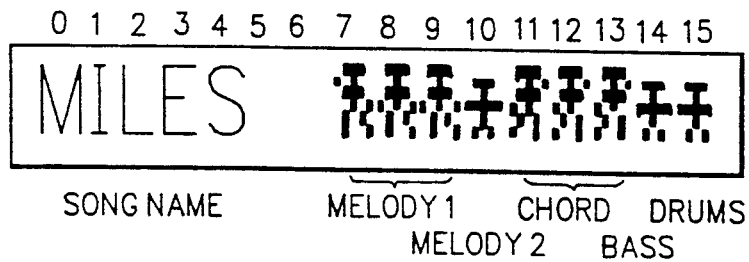

The display 30 has the LCD display section 31. The display section 31 is divided into 16 display regions ("0" to "15"), as shown in FIGS. 12(a) and 12(b) In this embodiment, the display regions "0" to "6" are assigned to a song name display; "7" to "9", a melody 1 display; "10", a melody 2 display; "11" to "13", a chord display; "14", a bass display; and "15", a drum display. However, this assignment is properly changed according to the kinds of auto-play data. Person patterns in various poses are displayed on the tone part display regions "7" to "15". The person pattern displayed on the melody line display regions "7" to "10" opens his right (right side from the viewer) leg as a basic pose. The person pattern displayed on the chord part display region "11" to "13" opens his left (left side from the viewer) leg as a basic pose. The person pattern displayed on the bass part display region "14" closes his both legs as a basic pose. The person pattern displayed on the drum part display region "15" opens his both legs as a basic pose. Since the basic poses of the person patterns to be displayed are changed in units of parts in this manner, the parts can be identified at a glance.

Note that these person patterns move their arms up and down as a song progresses. Each of person patterns in a sitting pose displayed on the display regions "11" to "13" in FIG. 12(a), and on the display regions "10", "14", and "15" in FIG. 12(b) indicates a rest state wherein the performance of the corresponding part is not currently made. The reason why a person pattern in a sitting pose is displayed in a rest state is that an inactive person pattern visually interferes with other active person patterns. For this reason, since an inactive person pattern is displayed in a sitting pose to have a short height, the motions of the other active person patterns can be further emphasized. Furthermore, the reason why one person pattern each is assigned to the melody line 2, bass part, and drum part display regions, and three person patterns each are assigned to the melody line 1 and chord part display regions is as follows. That is, a monophonic performance is often performed in the melody line 2 part, the bass part, and the drum part, while a performance in the melody line 1 and the chord part requires many pieces of tone information (many tones).

The motions of the three person patterns displayed in the melody line 1 part are controlled in turn every time tone information of the melody line 1 part (key number) is detected. Contrary to this, the motions of the three person patterns displayed in the chord part are simultaneously controlled regardless of the number of tones when tone information of the chord part is detected. This is to prevent a variation in motion of the person patterns according to the number of tones since chord tones constituting the chord part are changed to three, four, or two tones.

Figure 6:
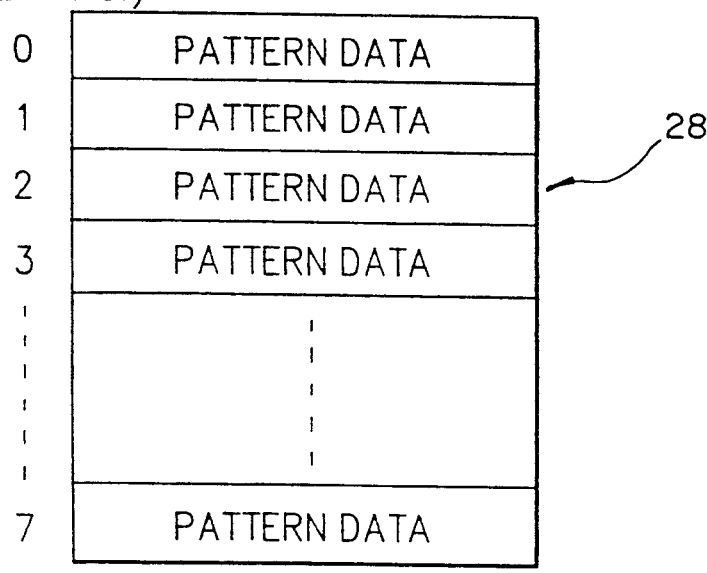
FIG. 6 is a view for explaining the configuration of a RAM arranged in a display.

As shown in FIG. 6, the display 30 has the RAM 28 in which eight kinds of pattern data read out from the ROM 4 in use of this electronic musical instrument are set in storage areas corresponding to addresses "0" to "7".

Figure 7:
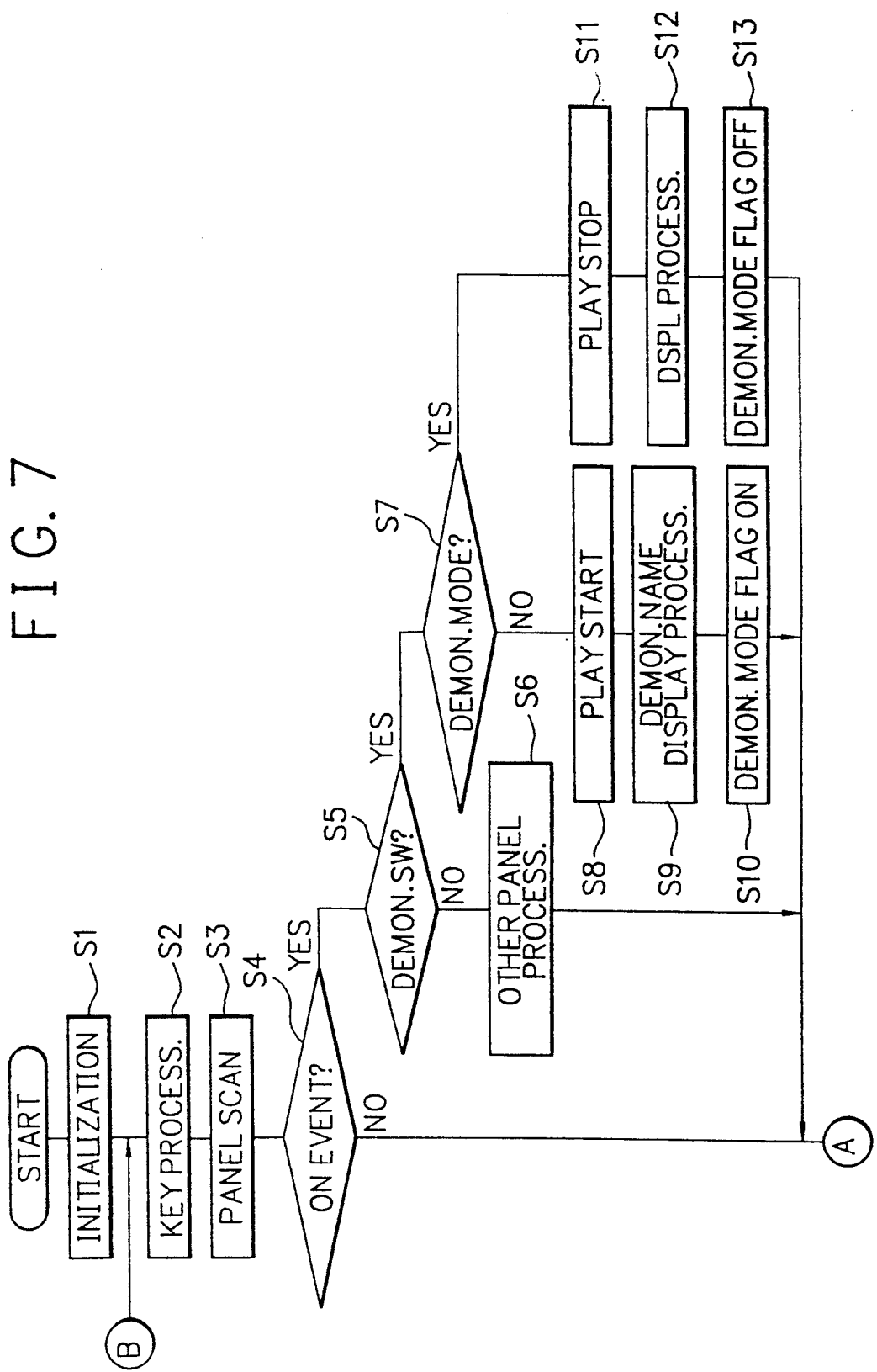
FIG. 7 is a flow chart showing a processing sequence of main processing executed by a CPU.
Figure 8:
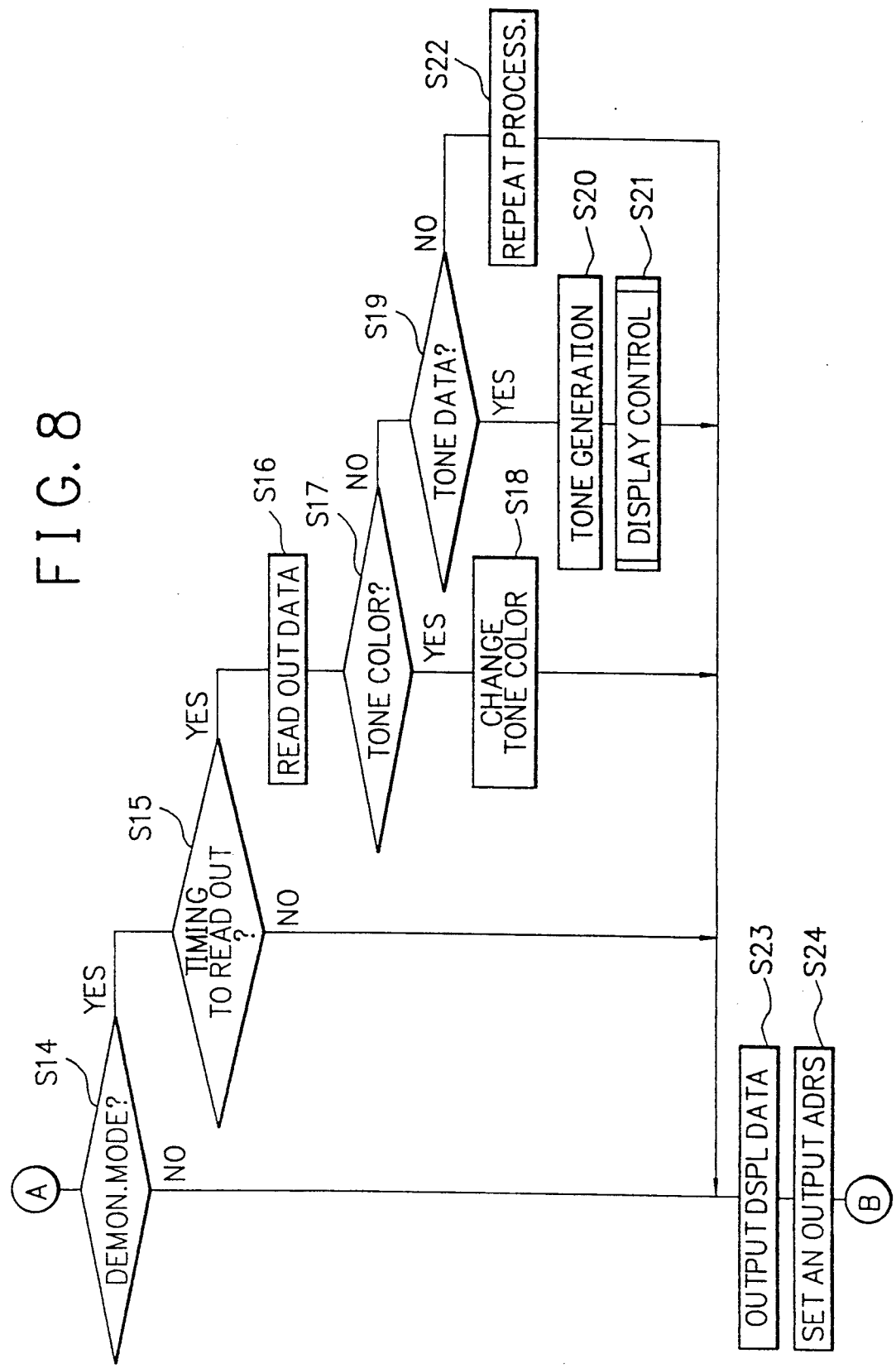
FIG. 8 is a flow chart showing the processing sequence of the main processing executed by the CPU.

FIGS. 7 and 8 are flow charts showing processing sequences of main processing executed by the CPU 3.

When the power switch of the electronic musical instrument is turned on, the CPU 3 executes initial processing in step S1. In this processing, the CPU 3 initializes the tone generator (sound source), clears the RAM 5, transfers pattern data stored in the ROM 4 to the RAM 28 arranged in the display 30, and so on.

In step S2, the CPU 3 performs key scan processing for sequentially checking operation states of all the keys of the keyboard 1. When the CPU 3 detects a key event, it executes processing corresponding to the key event.

In step S3, the CPU 3 executes panel scan processing for sequentially checking operation states of all the operation members of the operation panel 2. When the CPU 3 detects an ON event of an operation member in step S4, the flow advances to step S5 to check if the operation member corresponding to the ON event is a demonstration switch for instructing the start and end of an auto-play operation. If NO in step S5, the flow advances to step S6 to execute processing according to the operated operation member; otherwise, it is checked in step S7 if a demonstration mode as a playback mode of auto-play data is currently set. If NO in step S7, the playback operation of auto-play data is started in step S8, and display processing for displaying a song name of a song to be automatically played on the display section 31 of the display 30 is executed in step S9. Thereafter, a demonstration mode flag is set in step S10, and the flow advances to the next processing. If it is determined in step S7 that the demonstration mode has already been set, the playback operation of the auto-play data is stopped in step S11, and the currently set tempo value, tone color name, and the like are displayed on the display section 31 of the display 30 in step S12. Thereafter, the demonstration mode flag is reset in step S13, and the flow then advances to the next processing.

If it is determined in step S4 that an ON event of an operation member is not detected, it is checked in step S14 if the demonstration mode is currently set. If YES in step S14, it is checked in step S15 if the read timing of auto-play data from the ROM 4 is reached. If YES in step S15, the auto-play data is read out from the ROM 4 in step S16, and it is checked in step S17 if the readout data is tone color information. If YES in step S17, a tone color is changed in step S18; otherwise, the flow advances to step S19 to check if the readout data is tone generation information, i.e., key number information. If YES in step S19, tone generation processing is executed in step S20, and thereafter, display control processing (to be described later) is executed in step S21. If it is determined in step S19 that the readout data is not tone generation information, the flow advances to step S22 to execute repeat processing for repetitively playing back auto-play data. Thereafter, the flow advances to step S23.

In step S23, data representing a pattern No. stored in the buffer LCDDBUF of the RAM 5 is output by one byte each to the display 30 so as to establish matching with the operation speed of the display 30. In step S24, an address (display position information) for designating a position to perform a current display on the display section 31 of the display 30 is set. Thus, pattern data assigned with the corresponding pattern No. is read out from the pattern data stored in the RAM 28 of the display 30, and a person pattern having a predetermined pose is displayed at the designated position of the display section 31 on the basis of the readout data.

Figure 9:
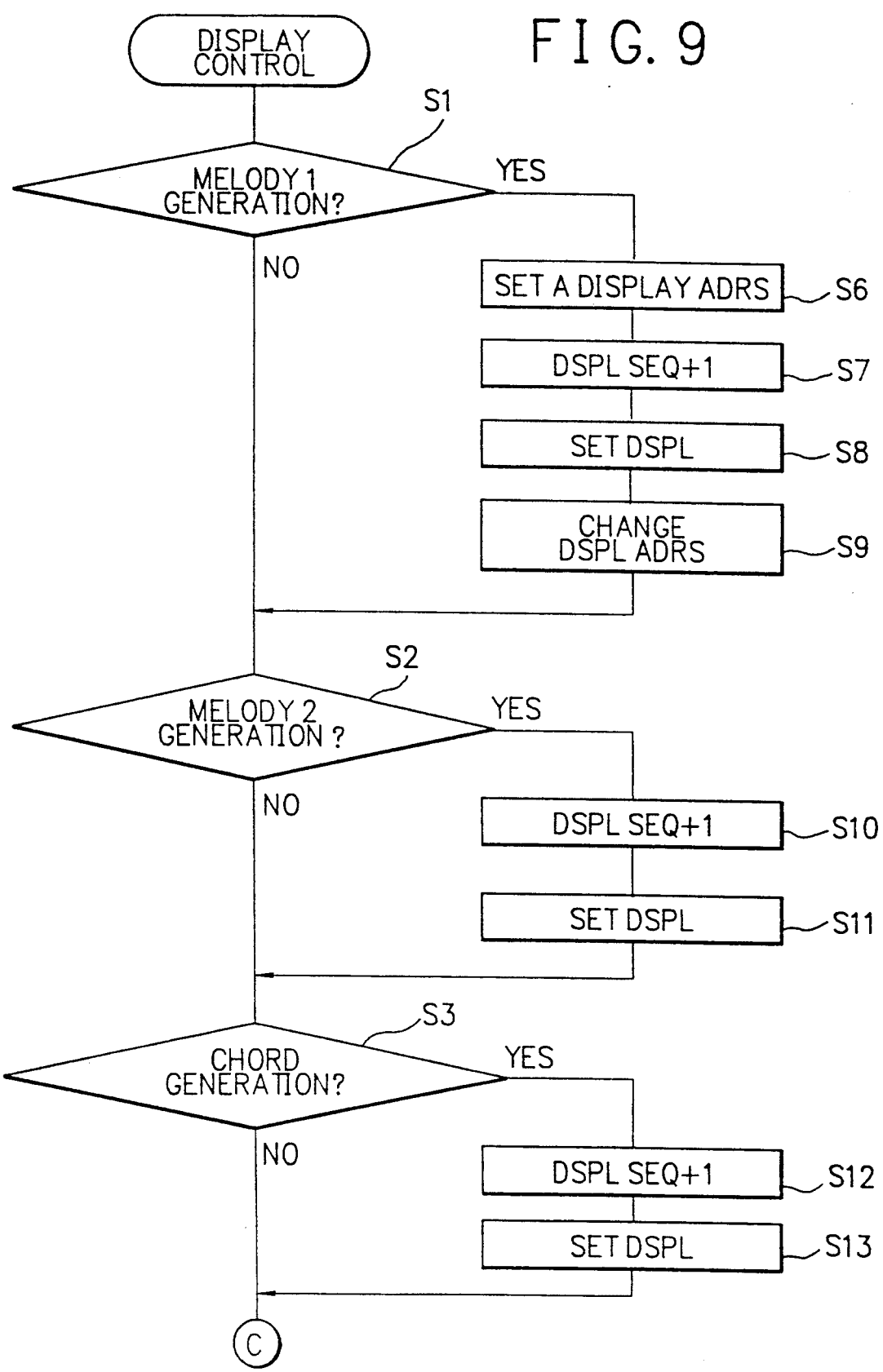
FIG. 9 is a flow chart for explaining in detail display control processing executed by the CPU.
Figure 10:
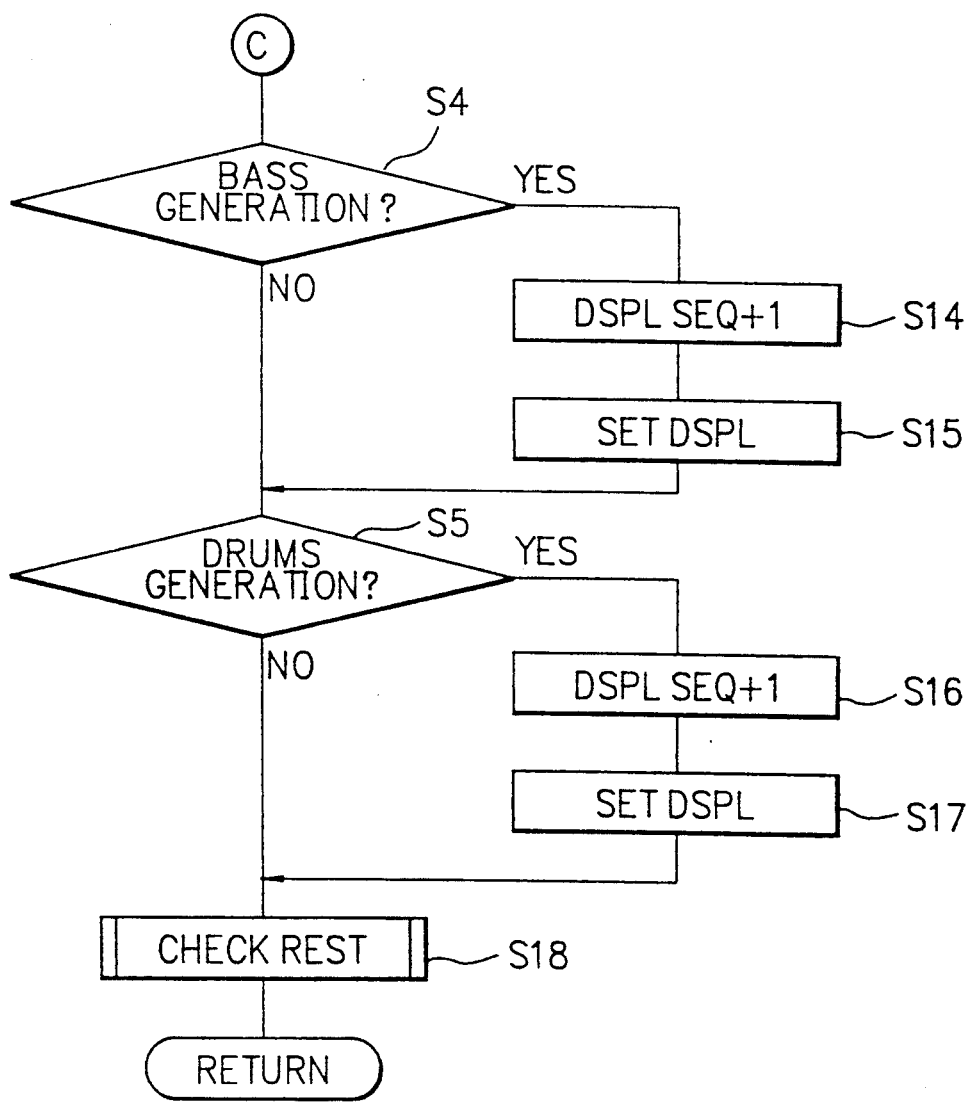
FIG. 10 is a flow chart for explaining in detail the display control processing executed by the CPU.

FIGS. 9 and 10 are flow charts for explaining in detail the display control processing in step S21 in FIG. 8.

In this processing, it is checked in steps S1 to S5 to which one of the melody line 1 part, melody line 2 part, chord part, bass part, and drum part the input tone generation information (key number information) corresponds. If it is determined that the input tone generation information corresponds to melody line 1 part, the flow advances to step S6. In step S6, in order to designate the current display position of the display section 31 of the display 30, the address of the buffer LCDDBUF of the RAM 5 is set in a predetermined register. In this case, the address to be set of the buffer LCDDBUF is one of the addresses of the storage areas corresponding to the display regions ("7" to "9") assigned to the melody line 1 part. In step S7, the display sequence shown in FIG. 4 is incremented by one to read out a pattern No. stored in the corresponding storage area, and the readout No. is stored in the storage area at the corresponding address of the buffer LCDDBUF set in step S6. In step S9, the address of the buffer LCDDBUF is incremented by one. With the processing in steps S6 to S9, every time tone generation information (key number information) belonging to the melody line 1 part is detected, the three person patterns corresponding to the melody line 1 part move their hands up and down in turn. Note that the content and sequence of this operation are determined by the above-mentioned display sequence (FIG. 4).

On the other hand, if it is determined in steps S2 to S5 that a tone in the melody line 2 part, chord part, bass part, or drum part is generated, the display sequence shown in FIG. 4 is incremented by one (step S10, S12, S14, or S16), and thereafter, a predetermined pattern No. is written in the storage area at the corresponding address of the buffer LCDDBUF (step S11, S13, S15 or S17). In this case, the pattern No. is written in the storage area of the buffer corresponding to the display region assigned to each part in the display section 31 of the display 30. In the case of the chord part, however, the same pattern No. is simultaneously written in the three storage areas of the buffer LCDDBUF corresponding to the three display regions ("11" to "13") display. Therefore, in the chord part, the three person patterns always make the same motion.

Figure 11:
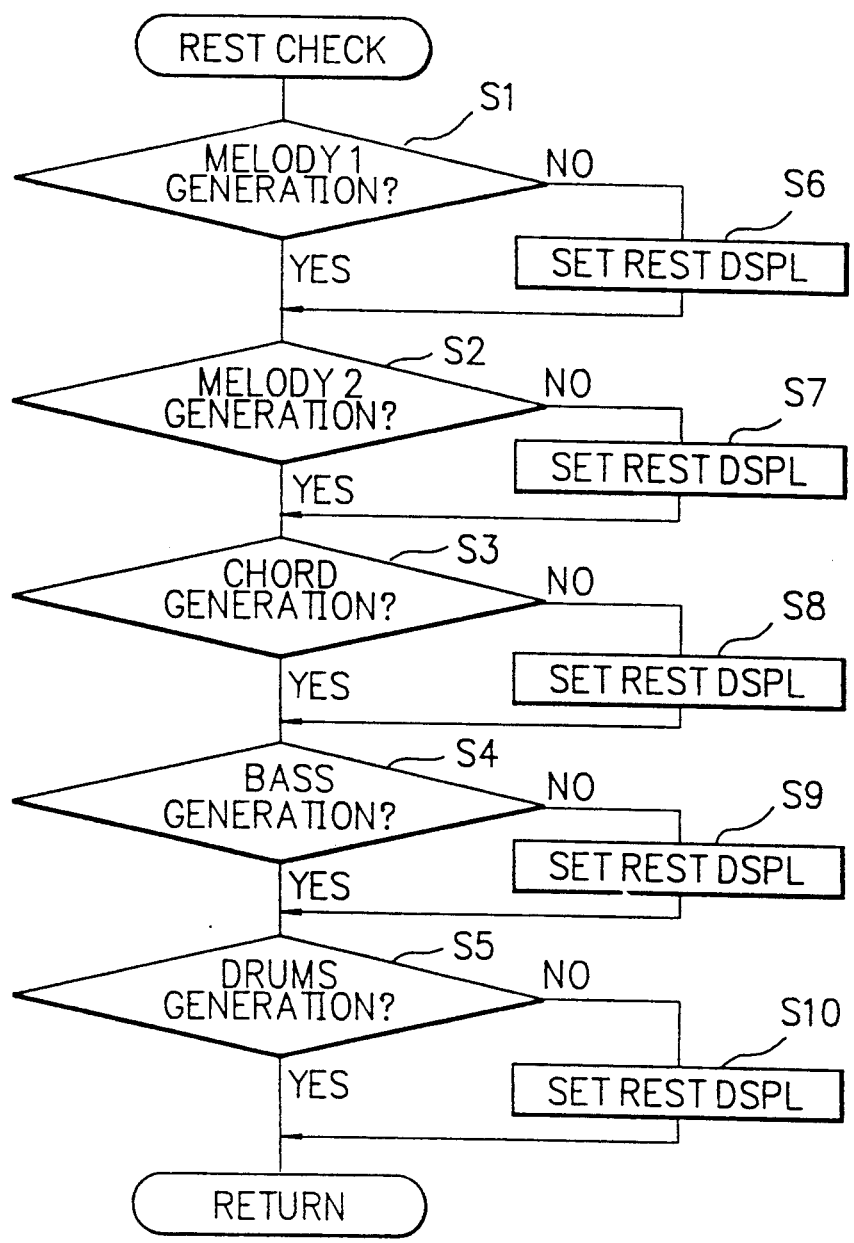
FIG. 11 is a flow chart for explaining in detail rest check processing executed by the CPU.

In this display control processing, after the above-mentioned processing operations are performed, rest check processing shown in FIG. 11 is executed in step S18, and the flow returns to the main routine shown in FIG. 8.

FIG. 11 is a flow chart for explaining in detail the above-mentioned rest check processing.

In this processing, it is checked in steps S1 to S5 if tone generation is being performed in each of the melody line 1 part, melody line 2 part, chord part, bass part, and drum part. If NO in the corresponding step, in order to display a person pattern in a sitting pose (see a chord part display in FIG. 12(a), and melody line 2, bass, and drum part displays in FIG. 12(b)) indicating a rest state, rest display setting processing is performed (steps S6 to S10). In this processing, a pattern No. for designating pattern data for displaying a person pattern indicating a rest state is written in the storage area of the buffer LCDDBUF of the RAM 5 corresponding to the non-tone generation part. Thus, in step S24 in the flow chart of FIG. 7 described above, display pattern data indicating a rest is read out from the corresponding address of the RAM 28, and a person pattern in a sitting pose indicating a rest state is displayed on the corresponding display region of the display section 31 of the display 30.

In the processing of step S6 or S8 of this processing, when the corresponding part is not subjected to tone generation, the pattern No. for designating rest pattern data is simultaneously written in the three storage areas of the buffer LCDDBUF corresponding to the part in order to simultaneously replace the three person patterns assigned to the corresponding part with person patterns indicating a rest state.

The embodiment of the present invention has been described. However, the present invention is not limited to the above embodiment, and various effective modifications may be made on the basis of the technical concepts of the present invention. For example, in the above embodiment, the person patterns are displayed on the display 30. Alternatively, animal patterns such as dogs, cats, and the like, may be displayed.

The RAMs 5 and 28 may be constituted by a single ROM. The display 30 may comprise a CPU for exclusively controlling display processing.

As described above, according to the present invention, every time a tone is played back on the basis of auto-play data, person or animal patterns displayed on the display can be variously changed. Thus, music can be visually expressed by fully utilizing the display function of the display, so that a user can enjoy music in both aural and visual senses.

Figure 13:
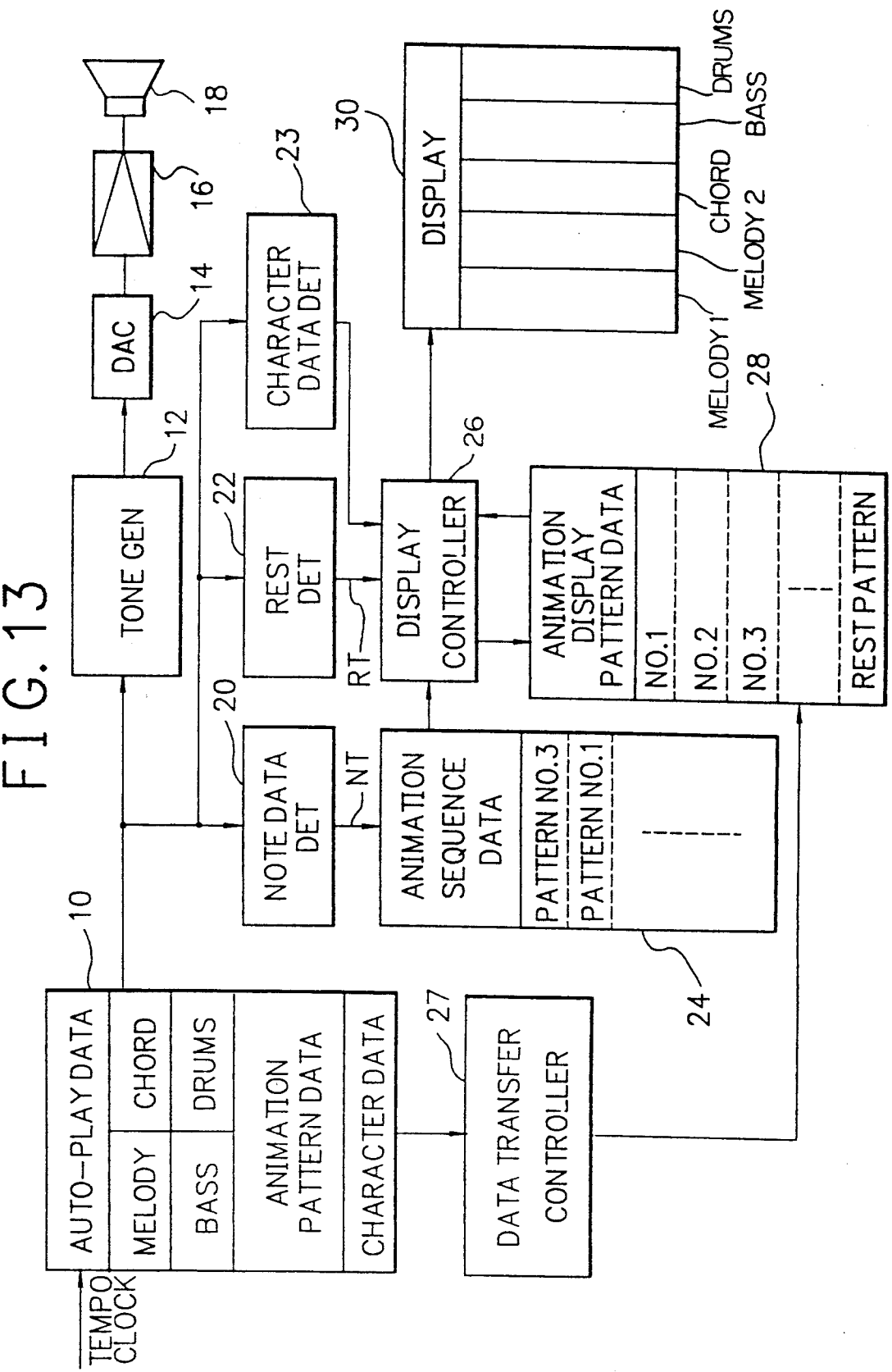
FIG. 13 is a block diagram showing a principal part of an auto-play apparatus according to another embodiment of the present invention.

FIG. 13 is a block diagram showing principal part of the second embodiment of an auto-play apparatus according to the present invention. The same reference numerals in FIG. 13 denote the same elements as in FIG. 1. In this embodiment, a ROM constituting an auto-play data source 10 stores animation pattern data inherent to a given auto-play operation as registration (rewrite) data in addition to auto-play data. A data transfer controller 27 for transferring the pattern data to a display RAM 28 is added.

Furthermore, auto-play data includes character data for displaying a song name, tone color name, bar number, chord name, and the like. The character data is detected by a character data detector 23, and is supplied to a display controller 26.

Figure 14:
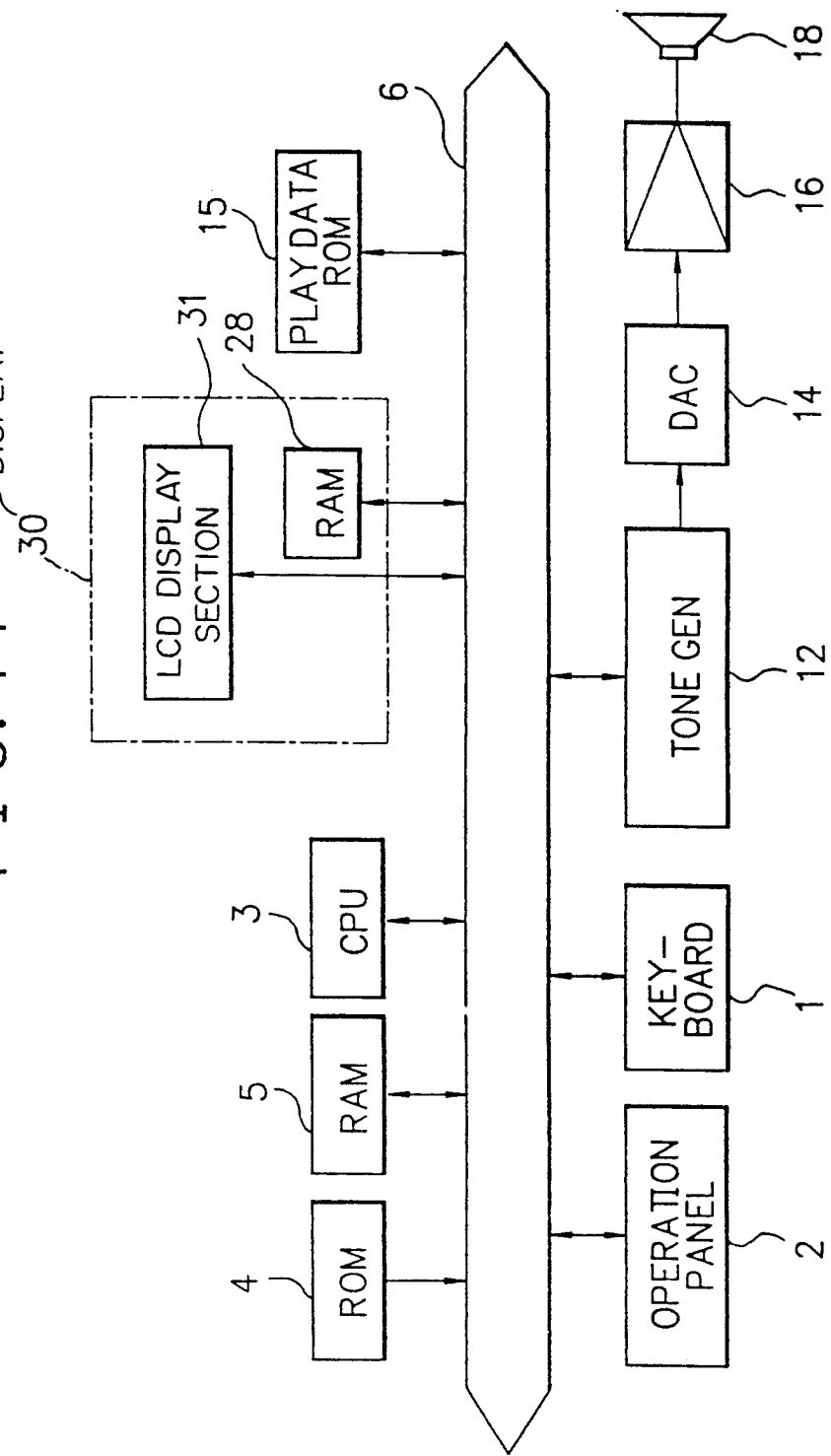
FIG. 14 is a block diagram showing an embodiment of an electronic musical instrument corresponding to FIG. 13.

FIG. 14 is a block diagram of an electronic musical instrument corresponding to FIG. 13, and is substantially the same as FIG. 2, except that a ROM 15 for storing auto-play data is added.

The play data ROM 15 stores several kinds of auto-play data used when an auto-play operation is performed. The auto-play data includes various pieces of information, as shown in FIG. 15. Information assigned with identification data 0F0H for identifying the kind of information consists of store address information for designating an address of the RAM 28, and pattern data for displaying a person pattern having a specific pose. Information assigned with identification data 0F1H is song name information, and information assigned with 0C0H is information associated with a program change mode such as a tone color change mode. Pieces of information assigned with identification data 0F2H, 0F3H, 0F4H, and 0F5H are respectively tone color name information, display sync information, bar No. information, and chord name information. Note data such as a key number for specifying the type of key, a step time indicating a tone generation timing, a gate time indicating a tone generation duration, a velocity indicating a key ON speed (tone generation level), and the like are expressed by data after 07FH. Note that 0E1H represents a repeat mark indicating a repeat point.

Figure 16:
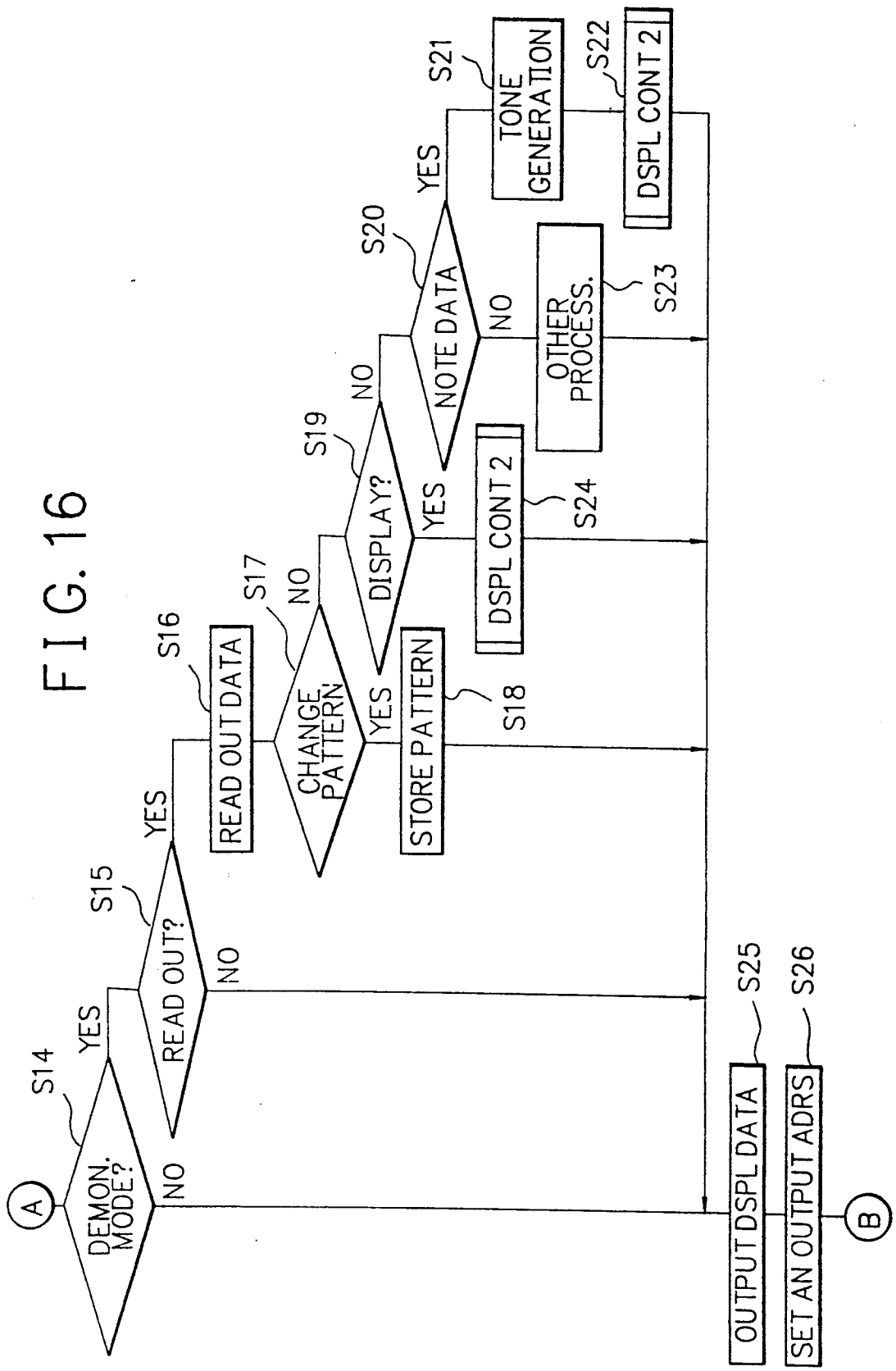
FIG. 16 is a flow chart showing a principal part of main processing executed by a CPU.

FIG. 16 shows main flow steps following the node "A" in FIG. 7. If it is determined in step S4 in FIG. 7 that an ON event of an operation member is not detected, it is checked in step S14 if a demonstration mode is currently set. If YES in step S14, it is checked in step S15 if the read timing of auto-play data from the ROM 15 is reached. If YES in step S15, auto-play data is read out from the ROM 15 in step S16, and it is checked in step S17 if the readout data is pattern change data (if the readout data is information assigned with 0F0H). If YES in step S17, a pattern is stored in step S18. In the processing in step S18, new pattern data stored in association with store address information of the information assigned with 0F0H shown in FIG. 15 is stored at the address of the RAM 28 designated by the store address information. Thus, pattern data stored at that address so far is rewritten with the new pattern data. In this manner, pattern data initially stored in the RAM 28 can be desirably rewritten based on information included in auto-play data stored in the ROM 15. Therefore, person patterns in various poses can be displayed on the display 30 according to, e.g., the kind of play data to be played back or every time the pattern of music is changed, without storing a large number of pattern data in the RAM 28 (without increasing the number of storage areas of the RAM 28 for storing pattern data). In addition, various pieces of information such as a tone color name, bar No., and the like (to be described later) can be desirably displayed on the display 30.

If it is determined in step S17 that the readout data is not pattern change data, the flow advances to decision steps S19 and S20 to check if the readout data is display change data (information assigned with identification data 0F1H or more) or note data (information with 07FH or less). If it is determined that the readout data is note data, i.e., one of key number data, step time data, gate time data, and velocity data, tone generation processing is executed in step S21, and thereafter, display control processing 1 (to be described later) is executed in step S22. If it is determined in step S20 that the readout data is not note data, the flow advances to step S23 to execute repeat processing for repetitively playing back auto-play data, program change processing for changing, e.g., a tone color, and the like. Thereafter, the flow advances to step S25.

If it is determined in step S19 that the readout data is display change data assigned with identification data 0F1H or more, display control processing 2 (to be described later) is executed in step S24, and the flow advances to processing in step S25.

In step S25, data representing a pattern No. stored in a buffer LCDDBUF of a RAM 5 is output by one byte each to the display 30 so as to establish matching with the operation speed of the display 30. In step S26, an address (display position information) for designating a position to perform a current display on a display section 31 of the display 30 is set. Thus, pattern data assigned with the corresponding pattern No. is read out from the pattern data stored in the RAM 28 of the display 30, and a person pattern having a predetermined pose is displayed at the designated position of the display section 31 on the basis of the readout data.

The display control processing 1 in step S22 in FIG. 16 is executed in the same processing sequence as that shown in FIGS. 9 and 10.

FIG. 17 is a flow chart for explaining in detail the display control processing 2 in step S24 in FIG. 16.

In this processing, it is checked in steps S1 to S4 to which one of tone color name data, bar No. data, display sync data, message data, and chord name data the data read out from a ROM 4 corresponds. If it is detected that the readout data is the tone color name data, i.e., information assigned with identification data 0F2H, a pattern No. for designating pattern data for displaying the corresponding tone color name on the display 30 is stored in the storage area at the corresponding address of the buffer LCDDBUF on the basis of the information in step S5. If it is detected that the readout data is the bar No. data, i.e., information assigned with identification data 0F4H, a pattern No. for designating pattern data for displaying the corresponding bar No. on the display 30 is stored in the storage area at the corresponding address of the buffer LCDDBUF on the basis of the information in step S6.

If it is detected that the readout data is the display sync data, i.e., information assigned with the identification data 0F3H, the flow advances to step S7, and the same pattern No. designated by the display sync data is written in all the storage areas of the buffer the display section 31. Therefore, with this processing, nine person patterns displayed on the display regions "7" to "15" of the display section 31 can be controlled to have the same pose at the beginning of the bar or an accent position.

Furthermore, if it is detected in step S4 that the readout data is the message data, i.e., information assigned with identification data 0F1H, a pattern No. for designating pattern data for displaying the corresponding message such as a song name on the display 30 is stored in the storage area at the corresponding address of the buffer LCDDBUF on the basis of the information in step S8. If it is determined in step S4 that the readout data is not the message data, the flow advances to step S9, and a pattern No. for designating pattern data for displaying the corresponding chord name on the display 30 is set in the storage area at the corresponding address of the buffer LCDDBUF on the basis of information assigned with identification data 0F5H.

Note that the tone color name, bar No., message, and chord name are displayed on display regions "0" to "6" of the display section 31.

As described above, according to the present invention, since person or animal patterns are changed according to display control information included in auto-play data, the person or animal patterns can be variously changed based on various pieces of display control information included in auto-play data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An auto-play musical instrument with an animation display controller by auto-play data, comprising:
   tone generator means for generating auto-play tones on the basis of auto-play data;
   means for supplying a series of auto-play data to said tone generator means;
   detection means, coupled to said means for supplying, for detecting note data constituting the auto-play data;
   animation sequence data memory means, coupled to said detection means, for storing animation sequence data and for outputting sequence data representing an animation sequence sequentially at every note timing detected by said detection means, the animation sequence data corresponding to an array of numbers of animation patterns to be displayed;
   animation display pattern data memory means for storing animation display pattern data representing poses of a person or animal; and
   display control means for reading out corresponding animation display pattern data from said animation display pattern data memory means in response to the animation sequence data obtained at every note timing from said animation sequence data memory means and for supplying the readout data to display means to display the animation sequence of the person or animal.

2. The auto-play musical instrument according to claim 1, wherein the auto-play data comprises a note data string having tone parts consisting of at least two melody parts, a chord part, a bass part, and a drum part, said display means having display regions corresponding to the tone parts, wherein patterns of the animation display pattern data are different for the tone parts.

3. The auto-play musical instrument according to claim 1, wherein the auto-play data comprises a note data string having tone parts consisting of at least two melody parts, a chord part, a bass part, and a drum part, said display means having display regions corresponding to the tone parts, wherein the display regions display different pluralities of display patterns for the tone parts.

4. The auto-play musical instrument according to claim 1, wherein the auto-play data comprises a note data string having tone parts consisting of at least two melody parts, a chord part, a bass part, and a drum part, said display means having display regions corresponding to the tone parts, wherein changes in poses of animation display patterns are different for the tone parts.

5. The auto-play musical instrument according to claim 1, further comprising:
 rest detection means, coupled to said means for supplying, for detecting a rest in the auto-play data,
 said animation display pattern data memory means storing rest pattern data corresponding to a rest,
 said display control means reading out the rest pattern data from said animation display pattern data memory means at a rest timing detected by said rest detection means and supplying the readout data to said display means.

6. The auto-play musical instrument according to claim 1, wherein the auto-play data includes display control data, the control data including animation display pattern data,
 the auto-play musical instrument further comprising data transfer means for transferring the animation display pattern data to said animation display pattern data memory means.

7. The auto-play musical instrument according to claim 1, wherein the auto-play data includes display control data, the display control data including character data indicating at least one of a sing name, rhythm name, tone color name, bar number, chord name, and message,
 the auto-play musical instrument further comprising character data detection means for detecting the character data, said display control means supplying character display data indicating a content of an auto-play operation on the basis of the character data from said character data detection means to said display means.

8. A method of generating auto-play music and displaying animation on display means of an auto-play musical instrument, in accordance with supplied auto-play data and animation sequence data and animation display pattern data stored in memory means, comprising the steps of:
 generating auto-play tones in accordance with the supplied auto-play data;
 generating note timing data indicative of a timing of note data of the supplied auto-play data, the note timing data occurring in units of tone part;
 reading out the animation sequence data in accordance with the generated note timing data, the animation sequence data corresponding to an array of numbers of animation patterns to be displayed;
 reading out the animation display pattern data in accordance with the numbers of animation patterns of the read-out animation sequence data, the animation display pattern data being stored in units of tone parts; and
 displaying on the display means an animation display pattern corresponding to the read-out animation display pattern data, the animation display pattern changing in accordance with tone part changes occurring in the note data.

9. The method of generating auto-play music and displaying animation according to claim 8, wherein the tone parts of the note data comprise at least two melody parts, a chord part, a bass part and a drum part,
 said step of displaying comprising displaying each of the tone parts in separate display regions on the display means.

10. The method of generating auto-play music and displaying animation according to claim 9, wherein each of the tone parts are displayed in the separate display regions and are represented by different pluralities of animation display patterns.

11. The method of generating auto-play music and displaying animation according to claim 10, wherein the animation display patterns for each of the tone parts changes differently.

12. The method of generating auto-play music and displaying animation according to claim 8, wherein the supplied auto-play data comprises display control data including the animation display pattern data, the method comprising the further step of:
 transferring the animation display pattern data to the memory means.

13. The method of generating auto-play music and displaying animation according to claim 12, wherein the display control data further includes character data indicative of at least one of a song name, rhythm name, tone color name, bar number, chord name and message, the method comprising the further step of:
 detecting the character data and supplying character display data indicative of an auto-play operation to the display means in accordance with the detected character data.

14. The method of generating auto-play music and displaying animation according to claim 8, comprising the further step of: p1 generating rest timing data indicative of rest times of the supplied auto-play data,
 rest pattern data being stored in the memory means and being read out in accordance with the generated rest timing data to display an animation display pattern corresponding to a rest state on the display means.

* * * * *